Sept. 5, 1967 P. K. WEYL 3,340,186

RECOVERY OF DEMINERALIZED WATER FROM SALINE WATERS

Filed May 14, 1964

INVENTOR

PETER K. WEYL

BY *Stowell & Stowell*

ATTORNEYS

United States Patent Office 3,340,186
Patented Sept. 5, 1967

3,340,186
RECOVERY OF DEMINERALIZED WATER
FROM SALINE WATERS
Peter K. Weyl, Corvallis, Oreg., assignor to Research Corporation, New York, N.Y., a non-profit corporation of New York
Filed May 14, 1964, Ser. No. 367,485
10 Claims. (Cl. 210—22)

This invention relates to a method and apparatus for the recovery of demineralized water from saline waters.

The necessity for recovering demineralized water from saline waters is of ever increasing importance and the problem is being extensively studied. Saline waters include sea water, saline ground water, waste waters resulting from industrial or residential water use and the like. Various approaches, particularly distillation and electrodialysis, have been evaluated in an attempt to find a practical method for making potable water from saline waters. The use of solar distillation has been studied in an attempt to minimize the amount of external energy required and to keep the cost of water production at a reasonable rate. Solar energy systems, while comparatively economical to operate, require a large expenditure for apparatus and/or cover large surface areas. There still remains a great need for an effective and economical process for the preparation of demineralized water from saline waters.

It is, therefore, an object of the present invention to provide an improved method and apparatus for the recovery of demineralized water from unpotable saline waters.

It is a further object of the present invention to provide a practical system for recovering demineralized water from saline waters and one which is designed to operate with a minimum external energy requirement and a minimum expenditure of capital and land for the plant.

Other objects and features of the present invention will be apparent from the following detailed description of the method and apparatus, and from consideration of the figures in the drawing wherein.

The above objectives are accomplished in accordance with the present invention whereby demineralized water is recovered from saline waters by providing a system wherein a body of saline water and a body of demineralized water at approximately equal hydrostatic pressure are separated by a porous hydrophobic membrane, the interstices of which are filled with air. Maintaining a positive temperature differential between the saline water and the fresh water will cause a portion of the warmer water to evaporate at the saltwater-membrane interface. The evaporated water produced will diffuse through the air in the membrane and condense at the fresh water-membrane interface. The temperature differential necessary for successful operation of the process will depend in part on the solute concentration in the saline solution.

In the process aspect, my invention is a method for the recovery of demineralized water from saline waters which comprises providing a warmer body of saline water and a cooler body of demineralized water separated by an air-filled, water vapor pervious, liquid impervious, porous hydrophobic membrane thereby causing water to pass from the warmer body of saline water to the cooler body of demineralized water. The required temperature differential may be established and/or maintained by using externally heated saline water or by the internal heating of the saline water. The two bodies of water may be stationary or moving, i.e., passing with respect to the membrane, and the process may be effected in a single stage or may be multi-staged.

In the apparatus aspect, my invention is an apparatus for the recovery of demineralized water from saline waters which comprises a vessel adapted to contain water or aqueous solutions, said vessel being divided into two water-tight compartments by an air-filled, water vapor pervious, liquid impervious, porous hydrophobic membrane, and means for heating the aqueous solution in one of the aforesaid compartments.

In a second apparatus aspect, my invention is an apparatus for the recovery of demineralized water from saline waters which comprises an air-filled, porous hydrophobic membrane, means for passing warmer saline water in contact with one side of the said membrane, and means for passing cooler demineralized water in contact with the other side of the said membrane. The apparatus may provide for a single stage passage of the saline water and the demineralized water with respect to the membrane or the passage may be in a series of stages. The apparatus may also provide a means for heating the saline water and a means for cooling the demineralized water.

Figure 1:
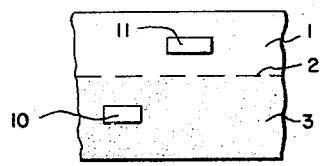
FIG. 1 is a fragmentary diagrammatic view of apparatus for the recovery of water from saline waters.

Referring to FIG. 1, there is illustrated the basic apparatus for the recovery of demineralized water from saline waters according to the present invention. FIG. 1 is a fragmented view showing a cooler body of demineralized water 1 separated from a warmer body of saline water 3 by a suitable air-filled, porous hydrophobic membrane 2. The bodies of water 1 and 3 may be stationary, either body may be moving with respect to the membrane and the other being stationary, or preferably both bodies may be moving, with respect to the membrane, either in the same direction or countercurrently to each other. The body of saline water 3 may be heated by means of solar heat or other conventional form of heating such as heater 10. The body of demineralized water 1 may be cooled by the atmosphere or by passing cool water or cool saline water through a heat exchanger 11 in contact with the demineralized water. Because of the differences in the vapor pressure of the two bodies of water due to the difference in their temperatures, the net result is for water to evaporate from the warmer saline solution, pass as a vapor through the air-filled passages of the hydrophobic membrane and condense in the cooler body of demineralized water.

As is well known, the vapor pressure of a solution is the partial pressure of the solvent in the vapor phase in equilibrium with the solution. The vapor pressure increases with temperature and decreases with the concentration of solute in the solution. Thus, if the solution and the pure solvent are maintained at the same temperature, the vapor would pass from the pure solvent through the membrane to the solute containing solution. In the process of the present invention the flow is in the other direction; the temperature differential between the two bodies of liquid changes their vapor pressure relationship and causes a reversal of the usual direction of solvent flow. Another important feature of the present process is that the solvent diffuses through the membrane as a gas, i.e., water vapor. That is, the solvent water undergoes a change in phase before passage through the hydrophobic membrane and then reverts to the liquid phase after passage through the membrane. Since a phase change is involved and water passes through the membrane as a vapor, the rejection of solute by the membrane is perfect when the solute is a nonvolatile solid. Thus it is possible to obtain 100 percent demineralization of saline waters using the process and apparatus of the present invention.

The basis for the process and apparatus of the present invention is my discovery that an air-filled, porous hydrophobic membrane can be used as the membrane in a vapor pressure system for the recovery of demineralized water from saline waters. This membrane must be hydrophobic and have sufficiently fine pores so that its interstices remain air-filled even when the membrane is in contact with water or water solutions. Thus, when such a membrane is used, to separate bodies of saline and demineralized waters, there will be no physical contact of the saline water with the demineralized water. Since water can only pass through the membrane by diffusion as a vapor, the rate of demineralized water recovery is inversely proportional to the thickness of the membrane and thin membranes are the most efficient in terms of demineralized water production. If two membranes are employed and an actual macroscopic air gap is present between the evaporating and condensing surfaces as in certain prior art devices, the rate of demineralized water production for the same temperature differential will be many hundred times lower than when a suitable hydrophobic membrane is employed. The use of a unitary and non-wettable, but vapor pervious hydrophobic membrane makes it possible to have the desired close proximity between the bodies of saline and demineralized water without their mixing.

Air filled hydrophobic membranes are good insulators so that heat transfer by conduction is minimized and most of the heat is transferred by evaporation from the solution and condensation at the demineralized water side of the membrane. Since the rates of heat transfer by both conduction and evaporation-condensation are inversely proportional to the membrane thickness, the thermal efficiency is independent of the membrane thickness. A thinner membrane has the advantage of providing a greater rate of demineralization per unit membrane area. Moreover, heat conduction through a body of liquid is more efficient than through a water saturated wick as is done in certain prior art devices. The wick acts as a partial insulator and inhibits convective transfer in the liquid. In addition, more energy has to be expended to cause water to flow through the wick than if there were merely a water film of equal thickness and precipitation of solids within the wick could occur. While there is no wick to clog in the apparatus of the present invention, precipitation could possibly reduce the efficiency of the present process by clogging the openings of the hydrophobic membrane or by impairing heat transfer. To avoid precipitation when operating according to the present invention, the concentration of saline water in any stage should only be increased by about 50 percent. If necessary, the saline water could be passed through a pack of minerals for precipitation of the supersaturated calcium solids to take place before the saline water is passed to the next desired concentration stage. For the earlier stages these mineral packs would contain calcium carbonate to prevent the formation of a lime deposit in the active part of the apparatus. Once the concentration has been doubled and the sea water becomes supersaturated with gypsum, the packs would then contain that mineral. At some stage before the saline water is concentrated sufficiently to precipitate sodium chloride it is expected that the vapor pressure of the saline solution will be reduced to such an extent that it is more economical to dump it rather than concentrate it further. By suitable heat exchange, most of the heat could be recovered from the warm saline solution before dumping.

To demonstrate the feasibility of the demineralization of saline water by the process of the present invention and to compare experimental rates of water recovery with those predicted by theory, the following experiments were carried out:

An apparatus was constructed consisting of two liquid-containing compartments approximately equal in volume and separated by a membrane. The system was so arranged that no hydrostatic pressure difference existed across the membarne and the body of water in each compartment was independently maintained at a constant temperature. The magnitude of the temperature difference between the compartments was measured by means of a copper-constantan thermocouple. The air-filled porous hydrophobic membrane employed was made of polytetrafluoroethylene and was one-eighth inch thick and had a mean pore opening of about 9 microns and a membrane porosity of about 42 percent. The displacement pressure for this membrane to water was between 1 and 2 pounds per square inch.

The water fluxes between the pair of compartments were measured at various temperature gradients for one to two hour periods. The liquid at the lower constant temperature of 25.3° C. was distilled water; the solution at the higher temperature was half normal sodium chloride, the water activity of which is approximately equal to the water activity of sea water. The experimentally observed fluxes of water in grams per square centimeter per second across the membrane are given in Table 1.

Assuming a tortuosity of unity, the theoretical diffusion flux of water vapor across the membrane is given by the equation $$J = \frac{-\overline{D}P}{X}(d_1 - d_2)$$

where $J$ is the flux in micrograms/cm.$^2$-sec., $\overline{D}$ the diffusion constant in cm.$^2$-sec., $P$ the effective membrane porosity, $X$ the thickness of the membrane in centimeters and $d_1$ and $d_2$ are the densities of water vapor in micrograms/cm.$^3$ in equilibrium with the two solutions. Using published data to derive $\overline{D}$ and the $d$'s, the theoretical flux was calculated and is also given in Table 1. For convenience, Table 1 also shows the experimental flux in units of gallons per square foot per day.

TABLE 1

| Temperature Difference ° D. | Flux J Calculated | Flux J Experimental | Flux in gal./ft.² day |
|---|---|---|---|
| 9.5 | 4.5 | 4.1 | 0.087 |
| 20.5 | 14.4 | 12.0 | 0.254 |
| 29.8 | 27.7 | 24.0 | 0.509 |

The agreement of the theoretical flux with the experimental flux is satisfactory. This series of experiments demonstrates that using an air-filled, porous hydrophobic membrane the demineralization of saline water does take place and that the flux of water can be predicted from theory. In this series of experiments, an air-filled, porous polytetrafluoroethylene membrane was employed. Any porous hydrophobic membrane, the interstices of which are filled with air and in which the pores are fine enough to exclude ingress of water by capillary action, may be employed. Suitable hydrophobic membranes can also be made of polyethylene, polypropylene, polyvinyl chloride and the like or of hydrophobic ceramic compositions. The membranes may also be constructed of non-hydrophobic material having hydrophobic surfaces provided by coating a suitable porous support with a hydrophobic substance, for example, by liquid or vapor impregnation. Pore diameters of about 0.2 mil or smaller, but not less than molecular dimensions, give satisfactory results. The porous membranes may be supported by external or integral lattices, such as metallic screen members.

Figure 2:
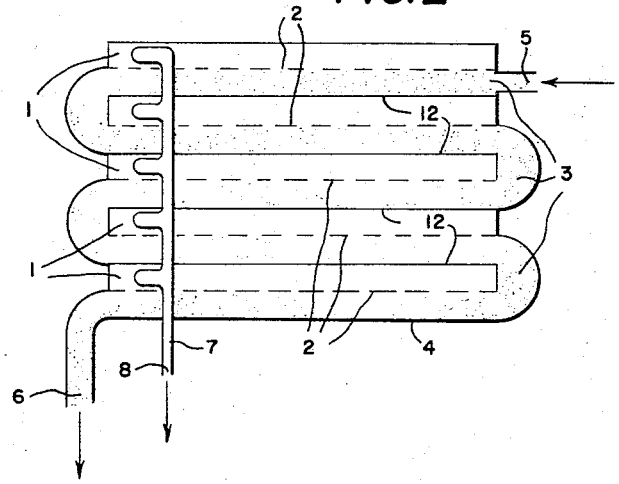
FIG. 2 is a diagrammatic view of a plural stage recovery apparatus.

If the saline water to be demineralized can be heated to a temperature about more than 20° C. warmer than the temperature at which heat is removed from the system, the membranes can be multi-staged to conserve heat energy. As illustrated in FIG. 2, the heat values can be passed from stage to stage. The five-stage system shown in the figure has a parallel plate geometry with heat supplied through the bottom plate 4. As the saline water 3 entering at 5 and leaving at 6 moves through the various stages, it becomes progressively warmer and more concentrated. The heat content of the saline water discharge can be utilized in a conventional manner to heat the saline water entering the first stage. If the saline water becomes supersaturated with calcium carbonate or calcium sulphate as it moves through the system, it can then be passed over beds of these materials (not shown) between stages of the membrane system to eliminate the supersaturation and thus reduce precipitation on the membrane and the metal heat exchange separators.

With upward heat flow in a system of horizontal stages as shown in FIG. 2, an essentially uniform temperature within each chamber is maintained by convection. The heat of condensation released in the demineralized water compartment of a stage is preferably transferred by conduction through metal separator walls 12 to the saline water compartment of the previous stage. Most of the temperature drop in each stage occurs across the hydrophobic membrane 2 as a result of the passage of water from the saline water solution 3 to the demineralized body of water 1 across the membrane. The demineralized water product above that required to operate the system is channeled into collector 7 and removed at port 8.

Figure 3:
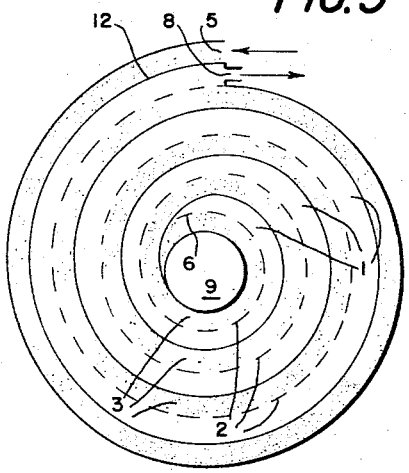
FIG. 3 is a diagrammatic view of still another form of my invention.

An alternate geometrical form for multi-stage operation is to have the hydrophobic membrane 2 coiled up into a cylinder as shown in FIG. 3. The saline water 3 enters at 5 and is removed at 6 and the resultant demineralized water 1 is removed at 8. Using this form, a simple gas flame could provide the heat in the hollow center section 9. The demineralized water product may be circulated through the apparatus in such a manner as to utilize its heat to further warm the saline water.

Since practical membranes will probably have low displacement pressures, probably less than five pounds per square inch in the water-air system, it is evident that in any given stage the demineralized water must be at essentially the same hydrostatic pressure as the saline water.

Having described my invention, I claim:

1. A method for the recovery of demineralized water from saline waters which comprises providing a warmer body of saline water and a cooler body of demineralized water separated by an air-filled, porous hydrophobic membrane thereby causing water to pass from the warmer body of saline water to the cooler body of demineralized water.

2. A method for the recovery of demineralized water from saline waters which comprises maintaining a warmer body of saline water and a cooler body of demineralized water separated by an air-filled, porous hydrophobic membrane thereby causing water to pass from the warmer body of saline water to the cooler body of demineralized water.

3. A method for the recovery of demineralized water from saline waters which comprises passing a warmer body of saline water in contact with and on one side of an air-filled, porous hydrophobic membrane and a cooler body of demineralized water in contact with and on the other side of the said membrane thereby causing water to pass from the warmer body of saline water to the cooler body of demineralized water.

4. A method according to claim 3 including the heating of the body of saline water.

5. A method according to claim 4 wherein the process is carried out in a series of stages.

6. A method according to claim 5 wherein supersaturated calcium salts are removed from the saline water before it is passed to the next succeeding stage.

7. Apparatus for the recovery of demineralized waters from saline waters which comprises a vessel adapted to contain aqueous solutions, said vessel being divided into two compartments by an air-filled, porous hydrophobic membrane, and means for heating the aqueous solution in one of the aforesaid compartments.

8. Apparatus for the recovery of demineralized water from saline waters which comprises an air-filled, porous hydrophobic membrane, means for passing warmer saline water in contact with and on one side of the said membrane, and means for passing cooler demineralized water in contact with the other side of the said membrane.

9. Apparatus for the recovery of demineralized water from saline waters which comprises an air-filled, porous hydrophobic membrane, means for passing warmer saline water in contact with and on one side of the said membrane, means for passing cooler demineralized water in contact with the other side of the said membrane, and means for warming the body of saline water.

10. Apparatus according to claim 9 wherein the recovery is effected in a series of stages.

References Cited

UNITED STATES PATENTS

| 3,129,145 | 4/1964 | Hassler | 203—10 |
| 3,129,146 | 4/1964 | Hassler | 203—10 |

OTHER REFERENCES

1962 Saline Water Conversion Report, Office of Saline Water, United States Department of the Interior, January 1963, pages 84–85 relied upon.

MORRIS O. WOLK, Primary Examiner.

E. G. WHITBY, Assistant Examiner.